United States Patent
Adams et al.

(10) Patent No.: US 9,571,519 B2
(45) Date of Patent: Feb. 14, 2017

(54) TARGETED ATTACK DISCOVERY

(71) Applicant: Juniper Networks, Inc., Sunnyvale, CA (US)

(72) Inventors: Kyle Adams, Brisbane, CA (US); Declan Conlon, Sydney (AU)

(73) Assignee: Juniper Networks, Inc., Sunnyvale, CA (US)

( * ) Notice: Subject to any disclaimer, the term of this patent is extended or adjusted under 35 U.S.C. 154(b) by 213 days.

(21) Appl. No.: 14/500,181

(22) Filed: Sep. 29, 2014

(65) Prior Publication Data

US 2016/0094565 A1 Mar. 31, 2016

(51) Int. Cl.
*H04L 29/06* (2006.01)
*G06F 21/56* (2013.01)
*G06F 21/57* (2013.01)

(52) U.S. Cl.
CPC .......... *H04L 63/145* (2013.01); *G06F 21/56* (2013.01); *G06F 21/577* (2013.01); *H04L 63/1416* (2013.01)

(58) Field of Classification Search
CPC .......................... H04L 63/145; H04L 63/1416
See application file for complete search history.

(56) References Cited

U.S. PATENT DOCUMENTS 7,808,916 B1 * 10/2010 Futamura ............ H04L 63/1416
370/241
2005/0198099 A1 * 9/2005 Motsinger ............... G06F 21/55
709/200
2007/0064617 A1 * 3/2007 Reves ................. H04L 63/1425
370/252

(Continued)

FOREIGN PATENT DOCUMENTS

WO 2004/021637 3/2004

OTHER PUBLICATIONS

Extended European Search Report corresponding to EP Application No. 15 16 0320, mailed Mar. 21, 2016, 6 pages.

*Primary Examiner* — Izunna Okeke
*Assistant Examiner* — Cheng-Feng Huang
(74) *Attorney, Agent, or Firm* — Harrity & Harrity, LLP

(57) ABSTRACT

A device may receive usage information, associated with a group of client networks, including particular usage information associated with a particular client network. The device may receive threat information, associated with the group of client networks, including particular threat information associated with the particular client network. The device may determine a baseline based on the usage information. The device may determine a normalization function, associated with the particular client network, based on the baseline and the particular usage information. The device may determine normalized threat information, associated with the particular client network, based on the normalization function and the particular threat information. The device may determine overall normalized threat information associated with the group of client networks. The device may compare the normalized threat information and the overall normalized threat information. The device may provide information associated with comparing the normalized threat information and the overall normalized threat information.

20 Claims, 9 Drawing Sheets

(56) References Cited

U.S. PATENT DOCUMENTS

| | | | |
|---|---|---|---|
| 2007/0150949 A1* | 6/2007 | Futamura | H04L 63/1416 726/22 |
| 2007/0192863 A1* | 8/2007 | Kapoor | G06F 9/505 726/23 |
| 2008/0109730 A1* | 5/2008 | Coffman | G06Q 30/02 715/733 |
| 2008/0295172 A1* | 11/2008 | Bohacek | H04L 63/1416 726/23 |
| 2009/0178139 A1 | 7/2009 | Stute et al. | |
| 2009/0271511 A1* | 10/2009 | Peracha | G06F 11/3419 709/224 |
| 2010/0284282 A1* | 11/2010 | Golic | H04L 43/022 370/242 |
| 2011/0145657 A1* | 6/2011 | Bishop | G06F 11/3495 714/47.1 |
| 2011/0214157 A1* | 9/2011 | Korsunsky | G06F 21/55 726/1 |
| 2013/0247205 A1* | 9/2013 | Schrecker | G06F 21/577 726/25 |
| 2015/0229662 A1* | 8/2015 | Hitt | H04L 63/1416 726/23 |

* cited by examiner

TARGETED ATTACK DISCOVERY

BACKGROUND

A security device may be positioned between a user device and a server device (e.g., a server device associated with a web site). The security device may be configured to detect (e.g., using uniform resource locator (URL) reputations, blacklists, anti-virus scanning, anti-malware techniques, etc.) malicious objects (e.g., a Trojan, a worm, a spyware program, etc.), provided by the server device, and may be configured to prevent the malicious objects from being received by the user device.

SUMMARY

According some possible implementations, a device may comprise one or more processors to: receive usage information associated with a group of client networks, where the usage information may include particular usage information associated with a particular client network of the group of client networks; receive threat information associated with the group of client networks, where the threat information may include particular threat information associated with the particular client network; determine a usage baseline based on the usage information associated with the group of client networks; determine a normalization function, associated with the particular client network, based on the usage baseline and the particular usage information; determine normalized threat information, associated with the particular client network, based on the normalization function and the particular threat information; determine overall normalized threat information associated with the group of client networks; compare the normalized threat information, associated with the particular client network, and the overall normalized threat information associated with the group of client networks; and provide information associated with comparing the normalized threat information, associated with the particular client network, and the overall normalized threat information associated with the group of client networks.

According to some possible implementations, a computer-readable medium may store one or more instructions that, when executed by one or more processors, cause the one or more processors to: obtain usage information, where the usage information may be associated with a group of networks, and where the usage information may include particular usage information associated with a particular network of the group of networks; obtain threat information, where the threat information may be associated with the group of networks, and where the threat information may include particular threat information associated with the particular network; determine a usage baseline based on the usage information associated with the group of networks; compute a normalization factor based on the usage baseline and the particular usage information, where the normalization factor may correspond to the particular network; determine normalized threat information based on the normalization factor and the particular threat information, where the normalized threat information may correspond to the particular network; determine overall normalized threat information, where the overall normalized threat information may be associated with the group of networks; compare the normalized threat information and the overall normalized threat information; and provide a threat assessment that is based on comparing the normalized threat information and the overall normalized threat information.

According to some possible implementations, a method may include: receiving, by a device, usage information associated with a set of client networks, where the usage information may include particular usage information associated with a particular client network of the set of client networks, and where the usage information may correspond to a particular period of time; receiving, by the device, threat information associated with the set of client networks, where the threat information may include particular threat information associated with the particular client network, and where the threat information may correspond to the particular period of time; determining, by the device, a usage baseline associated with the set of client networks, where the usage baseline being determined based on the usage information; determining, by the device, a normalization function associated with the particular client network, where the normalization function may be determined based on the usage baseline and the particular usage information; determining, by the device, normalized threat information associated with the particular client network, where the normalized threat information may be determined based on applying the normalization function to the particular threat information; determining, by the device, overall normalized threat information associated with the set of client networks; comparing, by the device, the normalized threat information and the overall normalized threat information; and providing, by the device, information associated with comparing the normalized threat information and the overall normalized threat information.

DETAILED DESCRIPTION

The following detailed description of example implementations refers to the accompanying drawings. The same reference numbers in different drawings may identify the same or similar elements.

A security device may implement a security solution to detect malicious objects (e.g., malware, viruses, worms, spyware, ransomware, etc.) associated with a client network. The security device may be capable of providing (e.g., to a client network administrator) a threat assessment that includes information associated with malicious objects detected in the client network. However, such a threat assessment may introduce a degree of confusion and/or may not be valuable since the threat assessment may not indicate what level of malicious activity (e.g., a quantity of malicious objects, a volume of malicious objects, a frequency of malicious objects, a type of malicious objects, a severity of malicious objects, etc.) may be normal (e.g., relative to other client networks) and/or what level of malicious activity may represent an increased level of malicious activity (e.g., a spike in the level of malicious activity).

One solution to overcome this problem is to compare a current level of malicious activity to one or more historical levels of malicious activity. The problem with this solution is that the solution may require a relatively long history in order to provide valuable insight into malicious activity trends. Moreover, this solution may not take global malicious activity trends (e.g., Internet wide trends, service provider wide trends, etc.) into consideration. As such, if a malicious object is released (e.g., onto the Internet) on a given day, it may be possible that the security device could detect an influx in the level of malicious activity in the client network, but this information may be of little value since the security device may be unable to compare the detected level of malicious activity to levels of malicious activity associated with other client networks.

Implementations described herein may provide a solution that allows a detected level of malicious activity, associated with a client network, to be compared to one or more other detected levels of malicious activity, associated with one or more other client networks, such that a threat assessment, associated with the client network, may provide insight associated with the detected level of malicious activity. In this way, a security device and/or an administrator, associated with the client network, may be notified that the client network is being targeted by malicious activity (e.g., and the security device may implement necessary measures in order to ensure that an infection does not take hold within the client network, accordingly).

Figure 1:
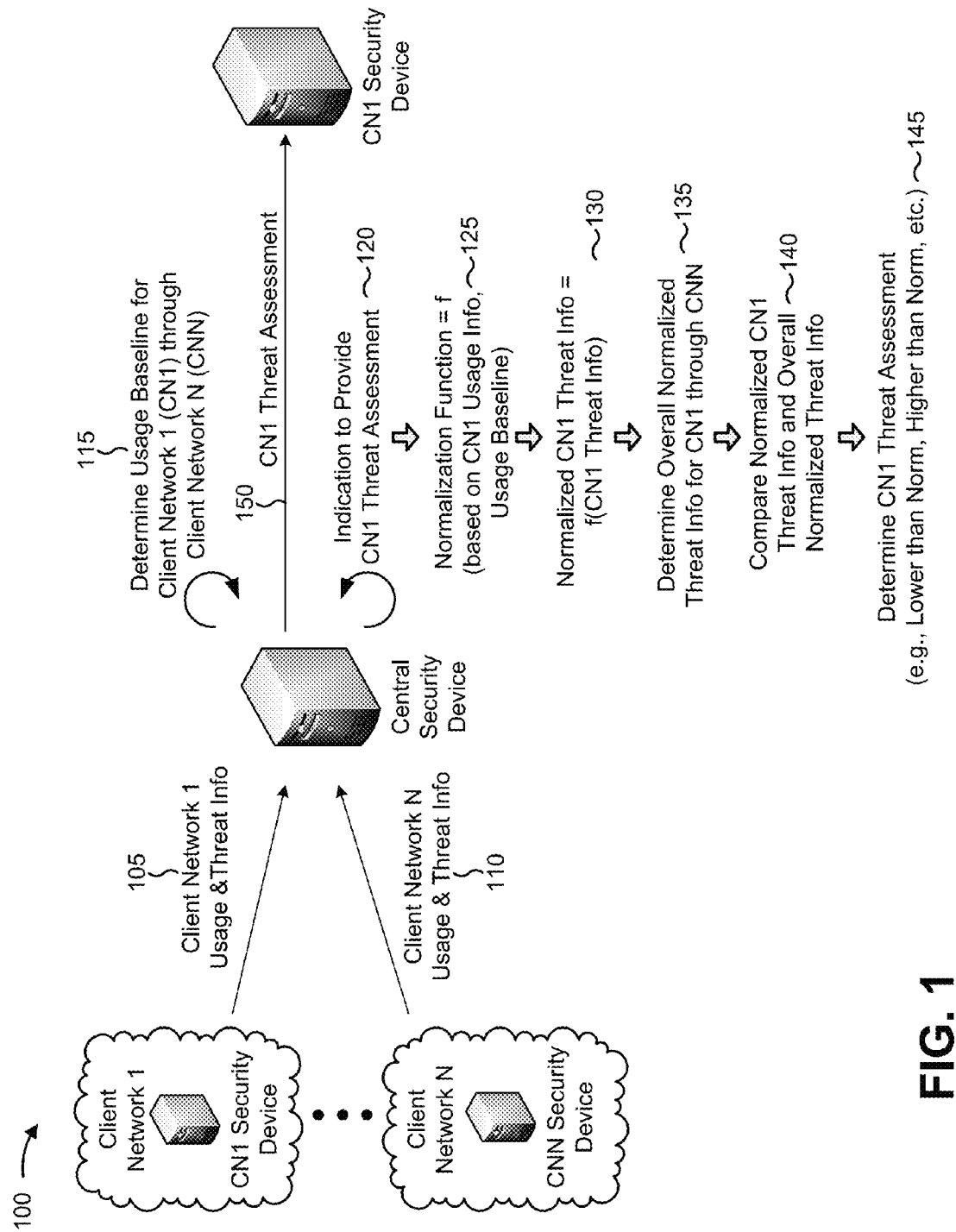
FIG. 1 is a diagram of an overview of an example implementation described herein.

FIG. 1 is a diagram of an overview of an example implementation 100 described herein. For the purposes of example implementation 100, assume that each client network in a group of client networks (e.g., client network 1 through client network N) includes a group of client devices and a security device. Further, assume that each security device, included in each client network, is configured to determine usage information, associated with a corresponding client network, and threat information, associated with the corresponding client network (herein referred to as usage and threat information), and provide the usage and threat information to a central security device associated with the group of client networks.

As shown in FIG. 1, and by reference number 105, a security device included in client network 1 (e.g., CN1 security device) may provide, to the central security device, usage and threat information associated with client network 1. Similarly, as shown by reference number 110, a security device included in client network N (e.g., CNN security device) may provide, to the central security device, usage and threat information associated with client network N. In some implementations, the central security device may cause a security device (e.g., the CN1 security device, the CNN security device, etc.), associated with a client network, to initiate a transfer of usage and threat information to the central security device (e.g., the CN1 security device may push CN1 usage and threat information to the central security device, the CNN security device may push CNN usage and threat information to the central security device). Additionally, or alternatively, the central security device may periodically request the usage and threat information from the security device (e.g., the central security device may pull the usage and threat information from the CN1 security device, the central security device may pull the usage and threat information from the CNN security device, etc.).

As shown by reference number 115, the central security device may receive the usage and threat information associated with client network 1 through client network N, and may determine a usage baseline associated with the client network 1 through client network N.

As shown by reference number 120, the central security device may receive an indication to provide a threat assessment associated with client network 1. As shown by reference number 125, the central security device may determine a normalization function, associated with client network 1, based on the usage baseline and usage information associated with client network 1. As shown by reference number 130, the central security device may then determine normalized threat information, associated with client network 1, based on the normalization function and threat information associated with client network 1.

As shown by reference number 135, the central security device may also determine overall normalized threat information, associated with client network 1 through client network N, and, as shown by reference number 140, the central security device may compare the normalized threat information, associated with client network 1, and the overall normalized threat information. As shown by reference number 145, based on comparing the normalized threat information, associated with client network 1, and the overall normalized threat information, the central security device may determine a threat assessment associated with client network 1. As shown by reference number 150, the central security device may provide the threat assessment to the security device included in client network 1, and the client network 1 security device may implement (e.g., update, adjust, modify, remove, derive, etc.) a security solution, associated with protecting client network 1, accordingly.

In this way, a central security device may provide a solution that allows a detected level of malicious activity, associated with a client network, to be compared to one or more other detected levels of malicious activity, associated with one or more other client networks, such that a threat assessment, associated with the client network, may provide insight associated with the detected level of malicious activity.

Figure 2:
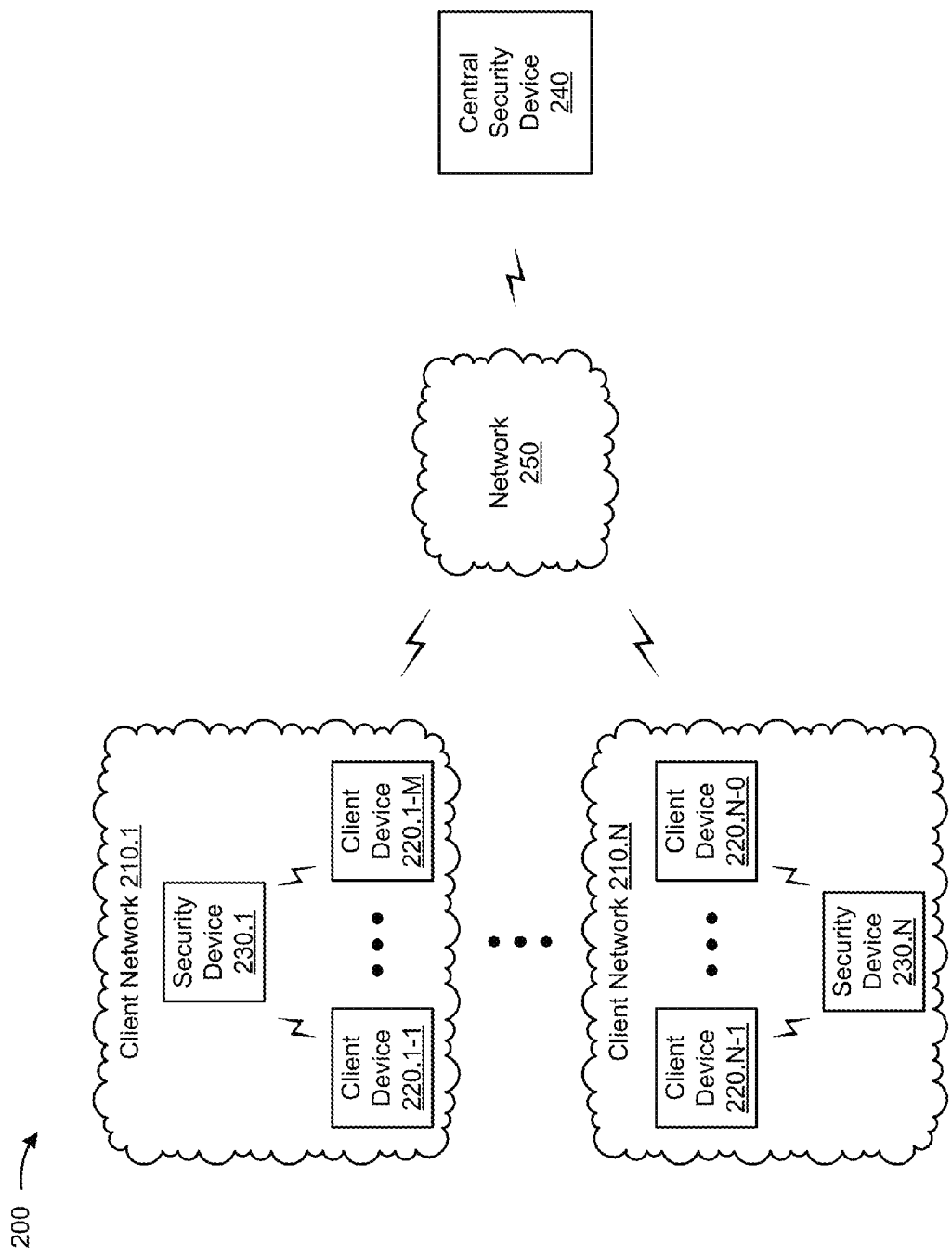
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include two or more client networks 210.1 through 210.N (N>1) (hereinafter referred to collectively as client networks 210, and individually as client network 210). As shown, each client network 210 may include one or more client devices 220 (e.g., client network 210.1 may include client device 220.1-1 through client device 220.1-M (M≥1), client network 210.N may include client device 220.N-1 through client device 220.N-O (O≥1), etc.), and a security device 230 (e.g., client network 210.1 may include security device 230.1, client network 210.N may include security device 230.N, etc.). As further shown, environment 200 may further include a central security device 240, and a network 250. Devices of environment 200 may interconnect via wired connections, wireless connections, or a combination of wired and wireless connections.

Client network 210 may include one or more wired and/or wireless networks associated with a group of client devices 220. For example, client network 210 may include a wireless local area network (WLAN), a local area network (LAN), a wide area network (WAN), a metropolitan area network (MAN), a telephone network (e.g., the Public Switched Telephone Network (PSTN)), a cellular network, a public land mobile network (PLMN), an ad hoc network, an intranet, the Internet, a fiber optic-based network, a cloud computing network, and/or a combination of these or other types of networks. In some implementations, client network 210 may include one or more client devices 220 and/or one or more security devices 230. In some implementations, client network 210 may be an enterprise network associated with a business, a company, a customer of a service provider, or the like.

Client device 220 may include one or more devices capable of communicating with other devices (e.g., other client devices 220) via a network (e.g., client network 210). For example, client device 220 may include a computing device, such as a laptop computer, a tablet computer, a handheld computer, a desktop computer, a mobile phone (e.g., a smart phone, a radiotelephone, etc.), a personal digital assistant, or a similar device. In some implementations, client device 220 may be included in client network 210.

Security device 230 may include one or more devices capable of receiving, generating, determining, providing, and/or storing usage information, associated with client network 210, and/or threat information associated with client network 210. For example, security device 230 may include a computing device, such as a server device, or a group of server devices. In some implementations, security device 230 may include one or more devices capable of processing and/or transferring communications (e.g., a request, a response, etc.) between client devices 220 included in client network 210. For example, security device 230 may include a network device, such as a reverse proxy, a server (e.g., a proxy server), a traffic transfer device, a firewall, a router, a load balancer, or the like.

Security device 230 may be used in connection with a single client network 210 or a group of client networks 210. Communications may be routed through security device 230 to reach the one or more client devices 220 included in client network 210. For example, security device 230 may be positioned within client network 210 as a gateway to a private network that includes one or more client devices 220.

Central security device 240 may include one or more devices capable of receiving, providing, generating, storing, and/or processing usage information and/or threat information associated with one or more client networks 210. For example, central security device 240 may include a computing device, such as a server device, or a collection of server devices. In some implementations, central security device 240 may be implemented within a cloud computing network using one or more virtual machines. In some implementations, central security device 240 may be capable of receiving (e.g., from security devices 230) usage information, associated with multiple client networks 210, and threat information, associated with the multiple client networks 210, and computing a usage baseline associated with the multiple client networks 210. Additionally, or alternatively, central security device 240 may be capable of determining a normalization function, associated with client network 210, based on the usage baseline and usage information associated with client network 210. Additionally, or alternatively, central security device 240 may be capable of determining normalized threat information, associated with client network 210, based on the normalization function.

Additionally, or alternatively, central security device 240 may be capable of, determining overall normalized threat information associated with the multiple client networks 210, and comparing the normalized threat information, associated with client network 210, and the overall normalized threat information associated with the multiple client networks 210. In some implementations, central security device 240 may be capable of identifying a subset of the overall normalized threat information (e.g., threat information associated with client devices 220 that host a particular operating system, threat information associated with client devices 2200 of a particular type, etc.), and comparing the subset of the overall normalized threat information and a corresponding subset of the normalized threat information associated with client network 210. Additionally, or alternatively, central security device 240 may be capable of providing a threat assessment, associated with client network 210, based on comparing the normalized threat information and the normalized threat information.

Network 250 may include one or more wired and/or wireless networks. For example, network 240 may include a WLAN, a LAN, a WAN, a MAN, a telephone network, a cellular network, a PLMN, an ad hoc network, an intranet, the Internet, a fiber optic-based network, a cloud computing network, and/or a combination of these or other types of networks. In some implementations, network 250 may allow communication between devices, such as client device 220, security device 230, and/or central security device 240.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
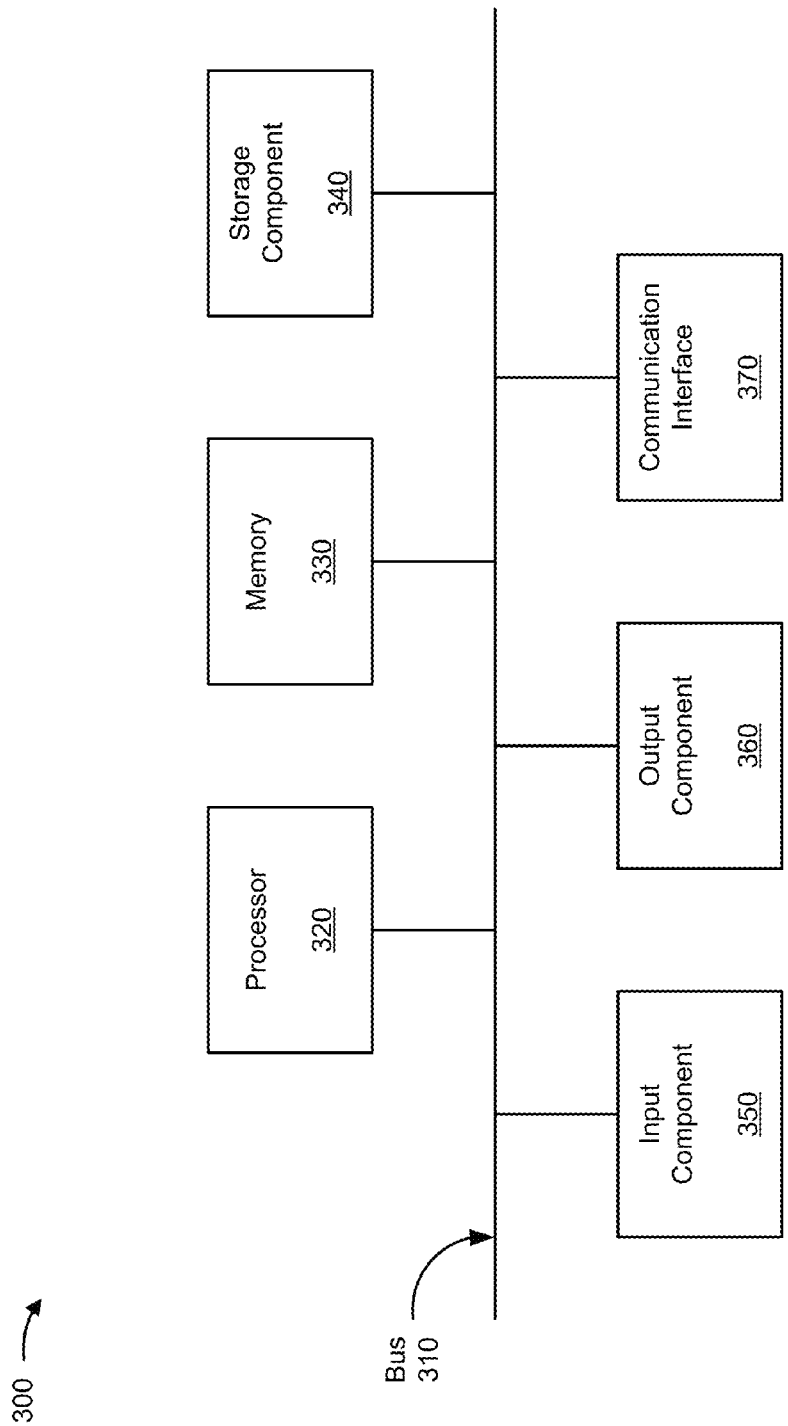
FIG. 3 is a diagram of example components of one or more devices of FIG. 2.

FIG. 3 is a diagram of example components of a device 300. Device 300 may correspond to client device 220, security device 230, and/or central security device 240. In some implementations, client device 220, security device 230, and/or central security device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
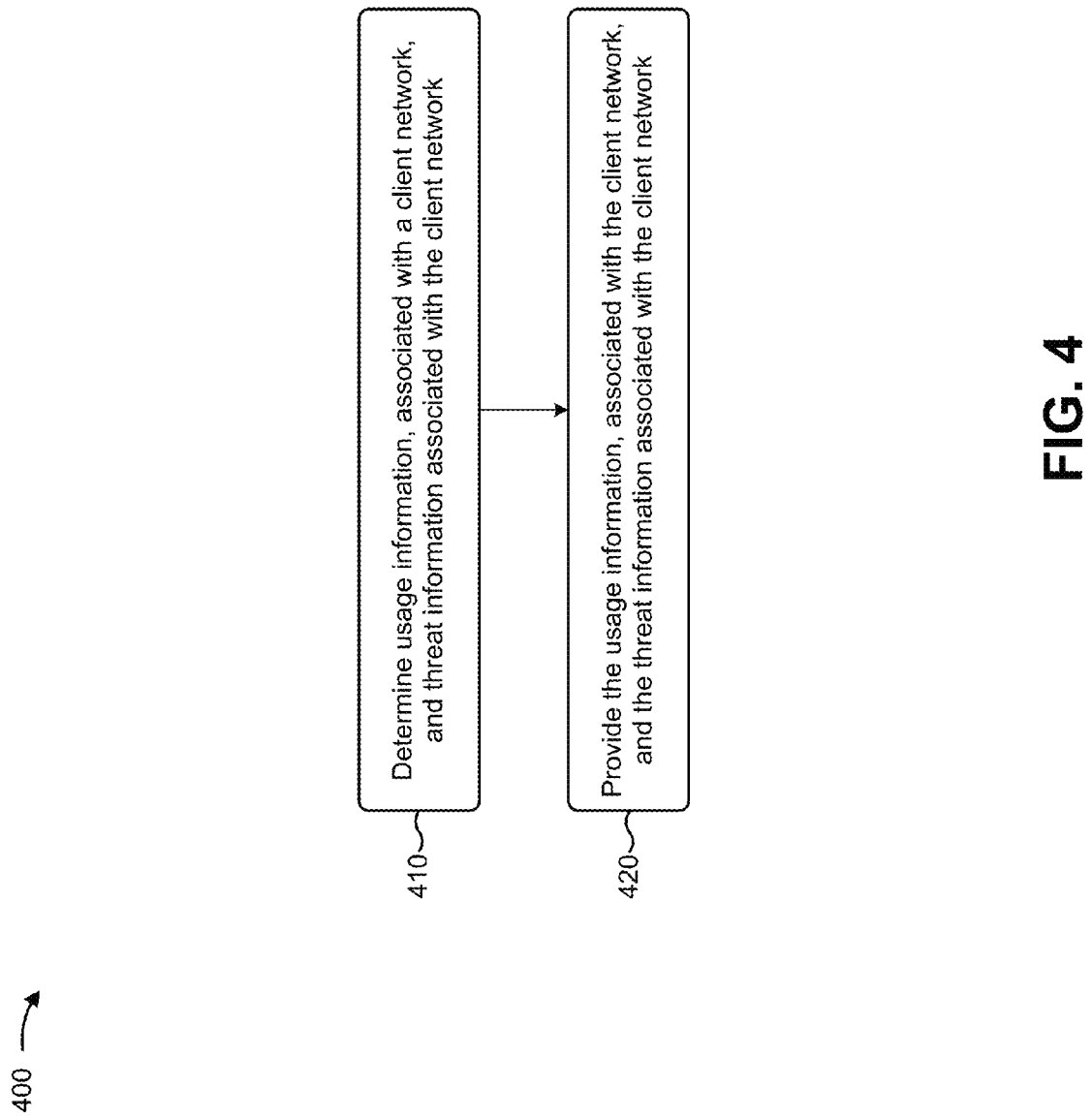
FIG. 4 is a flow chart of an example process for determining and providing usage information, associated with a client network, and threat information associated with the client network.

FIG. 4 is a flow chart of an example process 400 for determining and providing usage information, associated with a client network, and threat information associated with the client network. In some implementations, one or more process blocks of FIG. 4 may be performed by security device 230. In some implementations, one or more process blocks of FIG. 4 may be performed by another device or a group of devices separate from or including security device 230, such as client device 220 or another device included in environment 200.

As shown in FIG. 4, process 400 may include determining usage information, associated with a client network, and threat information associated with the client network (block 410). For example, security device 230 may determine usage information, associated with client network 210, and threat information associated with client network 210 (herein referred to as usage and threat information). In some implementations, security device 230 may determine the usage and threat information when security device 230 receives an indication that security device 230 is to determine the usage and threat information. Additionally, or alternatively, security device 230 may (e.g., automatically) determine the usage and threat information at regular intervals of time (e.g., without receiving an indication).

Usage information, associated with client network 210, may include information associated with one or more metrics associated with a manner in which client devices 220, included in client network 210, use client network 210. For example, the usage information may include a quantity of client devices 220 included in client network 210, an amount of throughput associated with each client device 220 included in client network 210, an average amount of total throughput associated with client network 210, a quantity of requests provided by client devices 220 included in client network 210, a quantity of responses received by client devices 220 included in client network 210, time of day information associated with a period of time during which client devices 220 are active (e.g., sending and/or receiving an amount of traffic that satisfies an activity threshold, powered on, connected to client network 210, or the like), time of day information associated with a period of time during which client devices 220 are inactive (e.g., sending and/or receiving an amount of traffic that does not satisfy the activity threshold, powered on, connected to client network 210, or the like), or another type of information associated with a manner in which client devices 220 use client network 210.

In some implementations, security device 230 may determine the usage information based on monitoring traffic associated with client network 210 and/or monitoring client devices 220. For example, security device 230 may be positioned such that traffic traversing client network 210 passes through security device 230, and security device 230 may monitor the usage information as the traffic passes through security device 230. Additionally, or alternatively, security device 230 may determine the usage information based on information received from another device. For example, security device 230 may request the usage information from one or more client devices 220, and security device 230 may determine the usage information based on a response to the request. Additionally, or alternatively, security device 230 may determine the usage information in another manner.

Threat information, associated with client network 210, may include information associated with malicious objects detected in client network 210. For example, the threat information may include information that identifies a quantity of malicious objects detected in client network 210, types of malicious objects detected in client network 210, severity of malicious objects detected in client network 210, a type of attack vector associated with malicious objects detected in client network 210, or another type of information associated with malicious objects detected in client network 210. As another example, the threat information may include information that identifies a malicious event associated with client network 210. For example, the threat information may include information associated with a port scanning event, a repeated login failure event, a blacklisted request, an exploit signature match, an unusual increase in traffic, an unusual increase in client devices 210 connecting to a server device, or another type of malicious event that may be detected by security device 230. While processes and/or methods described herein are described in the context of threat information associated with malicious objects, in some implementations, these processes and/or methods may equally apply to threat information associated with malicious events and/or threat information associated with malicious objects and malicious events.

In some implementations, security device 230 may determine the threat information based on performing a security function associated with client network 210. For example, security device 230 may be positioned such that traffic traversing client network 210 passes through security device 230, and security device 230 may perform a security function (e.g., a firewall function, a filtering function, a scanning function, etc.) to detect malicious objects traversing client network 210. In this example, security device 230 may determine threat information, associated with the malicious objects, based on detecting the malicious objects. Additionally, or alternatively, security device 230 may determine the threat information based on information received from another device. For example, security device 230 may request the threat information from one or more client devices 220 (e.g., when the one or more client devices 220 are configured to implement a security function associated with client network 210), and security device 230 may determine the threat information based on a response to the request. As another example, security device 230 may request the threat information from one or more other devices (e.g., external to client network 210, included in client network 210, etc.) configured to implement a security function associated with client network 210, and security device 230 may determine the threat information based on a response to the request. Additionally, or alternatively, security device 230 may determine the threat information in another manner.

As further shown in FIG. 4, process 400 may include providing the usage information, associated with the client network, and the threat information associated with the client network (block 420). For example, security device 230 may provide the usage and threat information. In some implementations, security device 230 may provide the usage and threat information after security device 230 determines the usage information associated with client network 210. Additionally, or alternatively, security device 230 may provide the usage and threat information after security device 230 determines the threat information associated with client network 210. Additionally, or alternatively, security device 230 may provide the usage and threat information when security device 230 receives an indication that security device 230 is to provide the usage and threat information.

In some implementations, security device 230 may provide the usage and threat information based on a period of time. For example, security device 230 may be configured to determine usage and threat information during a period of time (e.g., a one minute period of time, a ten minute period of time, a one hour period of time, etc.), and security device 230 may provide the usage and threat information at the end of the period of time. Security device 230 may then determine and provide usage and threat information for a next period of time (e.g., immediately following the period of time) in a similar manner, and so on.

Additionally, or alternatively, security device 230 may provide the usage and threat information based on a threshold. For example, security device 230 may be configured to provide the usage and threat information when security device 230 has detected a quantity of malicious objects that satisfies a threat threshold (e.g., 100 malicious objects, 40 malicious objects of a particular malicious object type, etc.).

Additionally, or alternatively, security device 230 may provide the usage and threat information based on a request. For example, central security device 240 may send, to security device 230, a request for the usage and threat information, and security device 230 may provide the usage and threat information accordingly.

In some implementations, security device 230 may provide the usage and threat information to central security device 240. In this way, central security device 240 may be provided with usage and threat information associated with multiple client networks 210.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
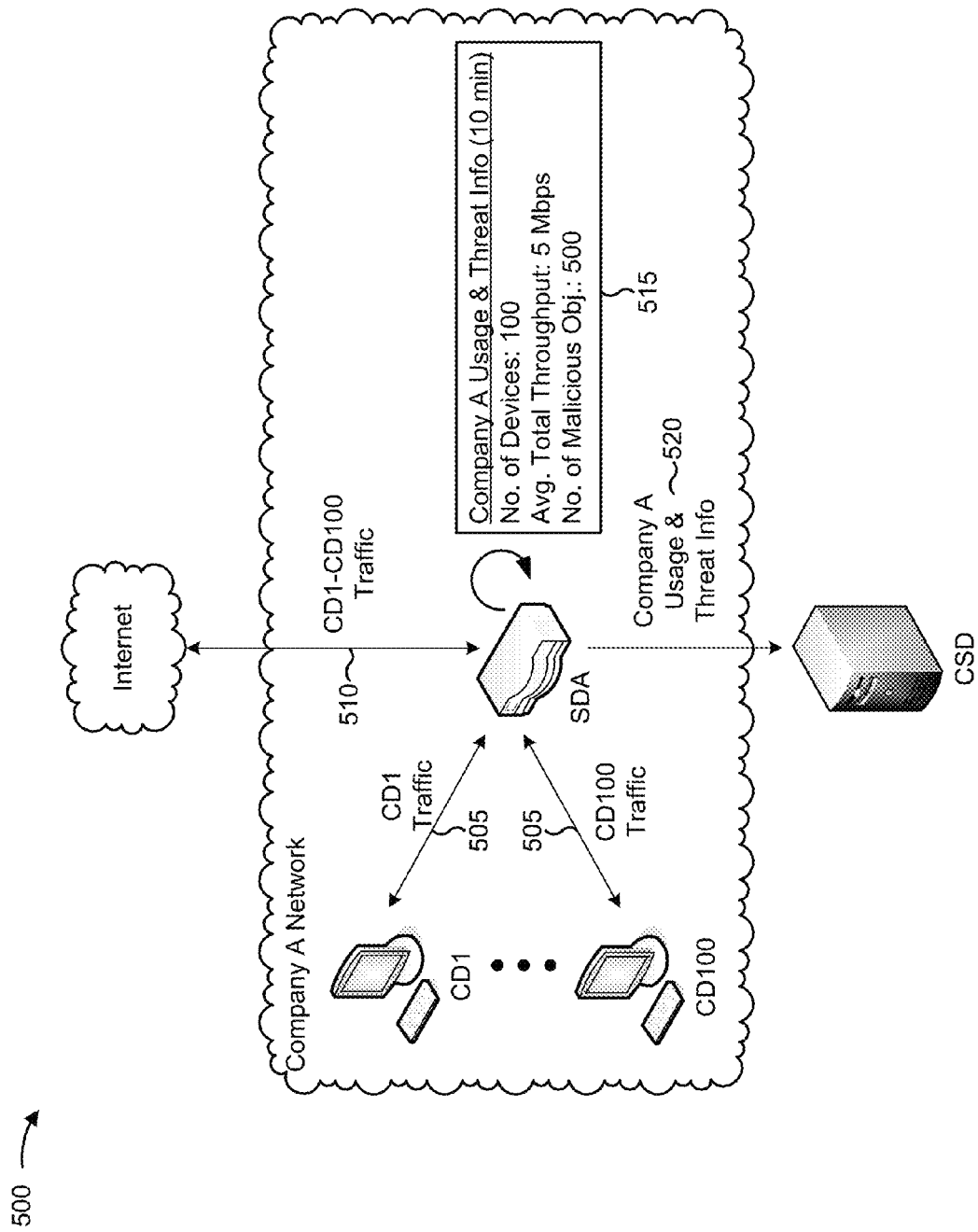
FIG. 5 is a diagram of an example implementation relating to the example process shown in FIG. 4.

FIG. 5 is a diagram of an example implementation 500 relating to example process 400 shown in FIG. 4. For the purposes of example implementation 500, assume that client network 210 (e.g., company A network) includes a group of client devices 220 (e.g., CD1 through CD100) and security device 230 (e.g., SDA). Further, assume that SDA is configured to provide usage information, associated with the company A network, and threat information, associated with the company A network, to central security device 240 (e.g., CSD).

As shown in FIG. 5, and by reference number 505 and reference number 510, SDA may be positioned such that company network A traffic (e.g., associated with CD1 through CD100) passes through SDA in order to access network 250 (e.g., the Internet). For the purposes of example implementation 500, assume that SDA is configured to determine usage and threat information, associated with company network A, for ten minute periods of time. As shown by reference number 515, SDA may determine (e.g., based on monitoring CD1 through CD100 traffic) usage information associated with the company A network for a first ten minute period of time. As shown, the usage information may indicate that company network A includes 100 devices, and that an average total throughput for the company A network, during the first ten minute period of time, is 5 megabits per second (Mbps).

As also shown by reference number 515, SDA may determine (e.g., based on performing a security function associated with the company A network) threat information associated with the company A network for the first ten minute period of time. As shown, the threat information may indicate that SDA detected 500 malicious objects traversing the company A network during the first ten minute period of time. As shown by reference number 520, SDA may provide, to CSD, the usage information, associated with the company A network, and the threat information, associated with the company A network, at the end of the first ten minute period of time. SDA may then determine and provide usage and threat information for a second ten minute period of time, a third ten minute period of time, and so on, in a similar manner.

As indicated above, FIG. 5 is provided merely as an example. Other examples are possible and may differ from what was described with regard to FIG. 5.

Figure 6:
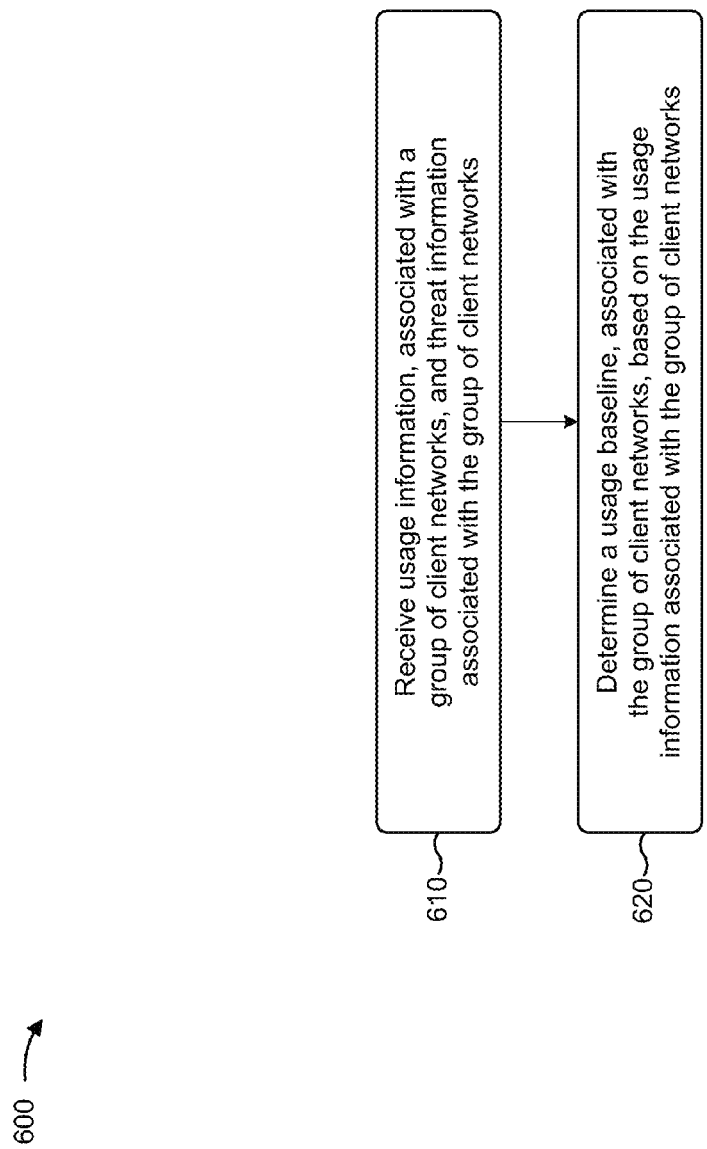
FIG. 6 is a flow chart of an example process for receiving usage information, associated with a group of client networks, and threat information, associated with the group of client networks, and determining a usage baseline associated with the group of client networks.

FIG. 6 is a flow chart of an example process 600 for receiving usage information, associated with a group of client networks, and threat information, associated with the group of client networks, and determining a usage baseline associated with the group of client networks. In some implementations, one or more process blocks of FIG. 6 may be performed by central security device 240. In some implementations, one or more process blocks of FIG. 6 may be performed by another device or a group of devices separate from or including central security device 240, such as security device 230 or another device included in environment 200.

As shown in FIG. 6, process 600 may include receiving usage information, associated with a group of client networks, and threat information associated with the group of client networks (block 610). For example, central security device 240 may receive usage information and threat information associated with a group of client networks 210. In some implementations, central security device 240 may receive the usage and threat information when a group of security devices 230 (e.g., corresponding to the group of client networks 210) provides the usage and threat information. Additionally, or alternatively, central security device 240 may receive the usage and threat information when central security device 240 requests (e.g., from the group of security devices 230) the usage and threat information.

In some implementations, central security device 240 may receive the usage and threat information when security device 230 provides the usage and threat information. For example, central security device 240 may receive the usage and threat information at a particular interval of time (e.g., based on a configuration of security device 230), based on a threshold, based on a request (e.g., sent by central security device 240), or the like, as described above.

In some implementations, central security device 240 may receive usage and threat information, associated with the group of client networks 210, that corresponds to one or more particular periods of time. For example, central security device 240 may receive first usage and threat information, associated with a first client network 210 and corresponding to a particular period of time (e.g., a period of time from 3:00 p.m. to 3:10 p.m. on Sep. 15, 2014, a period of time from 1:00 p.m. to 2:00 p.m. on Sep. 18, 2014, etc.), and second usage and threat information associated with a second client network 210 and corresponding to the particular period of time. As another example, central security device 240 may receive first usage and threat information, associated with a first client network 210 and corresponding to a group of particular periods of time (e.g., a group of Fridays during a three-month period, a group Mondays during a one year period, etc.), and second usage and threat information associated with a second client network 210 and corresponding to the group of particular periods of time.

Additionally, or alternatively, central security device 240 may receive a subset of usage and threat information associated with the group of client networks 210. For example, central security device 240 may receive usage and threat information, associated with the group of client networks 210, that corresponds to a type of client devices 220 included in the group of client networks 210, an operating system hosted by client devices 220 included in the group of client networks 210, or the like. This may allow central security device 240 to determine a usage baseline, associated with the group of client networks 210, for the particular period of time, as described below.

As further shown in FIG. 6, process 600 may include determining a usage baseline, associated with the group of client networks, based on the usage information associated with the group of client devices (block 620). For example, central security device 240 may determine a usage baseline, associated with the group of client networks 210, based on the usage information associated with the group of client networks 210. In some implementations, central security device 240 may determine the usage baseline after central security device 240 receives the usage and threat information associated with the group of client networks 210. Additionally, or alternatively, central security device 240 may determine the usage baseline when central security device 240 receives an indication that central security device 240 is to determine the usage baseline.

A usage baseline may include a basis for comparing usage information associated with a group client networks 210. For example, the usage baseline may include a value equal to a mean usage metric (e.g., average total throughput, throughput per device, requests per five devices, responses received per device, etc.) associated with the group of client networks 210, a value equal to median usage metric associated with the group of client networks 210, a value equal to a mode usage metric per device associated with the group of client networks 210, or the like. In some implementations, the usage baseline may allow threat information, associated with two or more client networks 210 (e.g., that include different quantities of client devices 220, that achieve different average total throughputs, etc.) to be compared, as described below.

In some implementations, central security device 240 may determine the usage baseline based on the usage information associated with the group of client networks 210. For example, central security device 240 may compute a first value for a usage metric (e.g., average throughput per device) corresponding to a first client network 210, a second value for the usage metric corresponding to a second client network 210, and so on. In this example, central security device 240 may compute values for the usage metric that correspond to each client network 210, and may determine a usage baseline as being equal to an average value of the values for the usage metric that correspond to each client network 210. Additionally, or alternatively, central security device 240 may determine the usage baseline in another manner (e.g., as being equal to a median value of the values for the usage metric, as being equal to a mode value of the values for the usage metric, etc.). In some implementations, central security device 240 may store (e.g., in a memory location of or accessible by central security device 240) the usage metric, such that central security device 240 may determine the usage baseline at a later time (e.g., in order to provide a threat assessment associated with client network 210). In some implementations, central security device 240 may determine a revised usage baseline (e.g., if central security device 240 determines a usage baseline and subsequently receives additional usage information, new usage information, updated usage information, or the like, then central security device 240 may determine a revised usage baseline, etc.).

In some implementations, central security device 240 may anonymize the usage and threat information when implementing the processes and/or methods described herein. In this way, central security device 240 may not take into consideration attributes of the group of client networks 210, such as types of the group of client networks 210 (e.g., retail, business, private, banking, etc.), location of the groups of client networks 210 (e.g., city, state, country, etc.), such that levels of malicious activity in the group of client networks 210 may be anonymously compared. Alternatively, central security device 240 may store information associated with attributes of the group of client networks (e.g., types of client networks 210, locations of client network 210, or the like), such that central security device 240 may compare malicious activity within a particular client network 210 to a subset of similar client networks 210 (e.g., banking client networks 210, client networks 210 located in a particular state, etc.).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
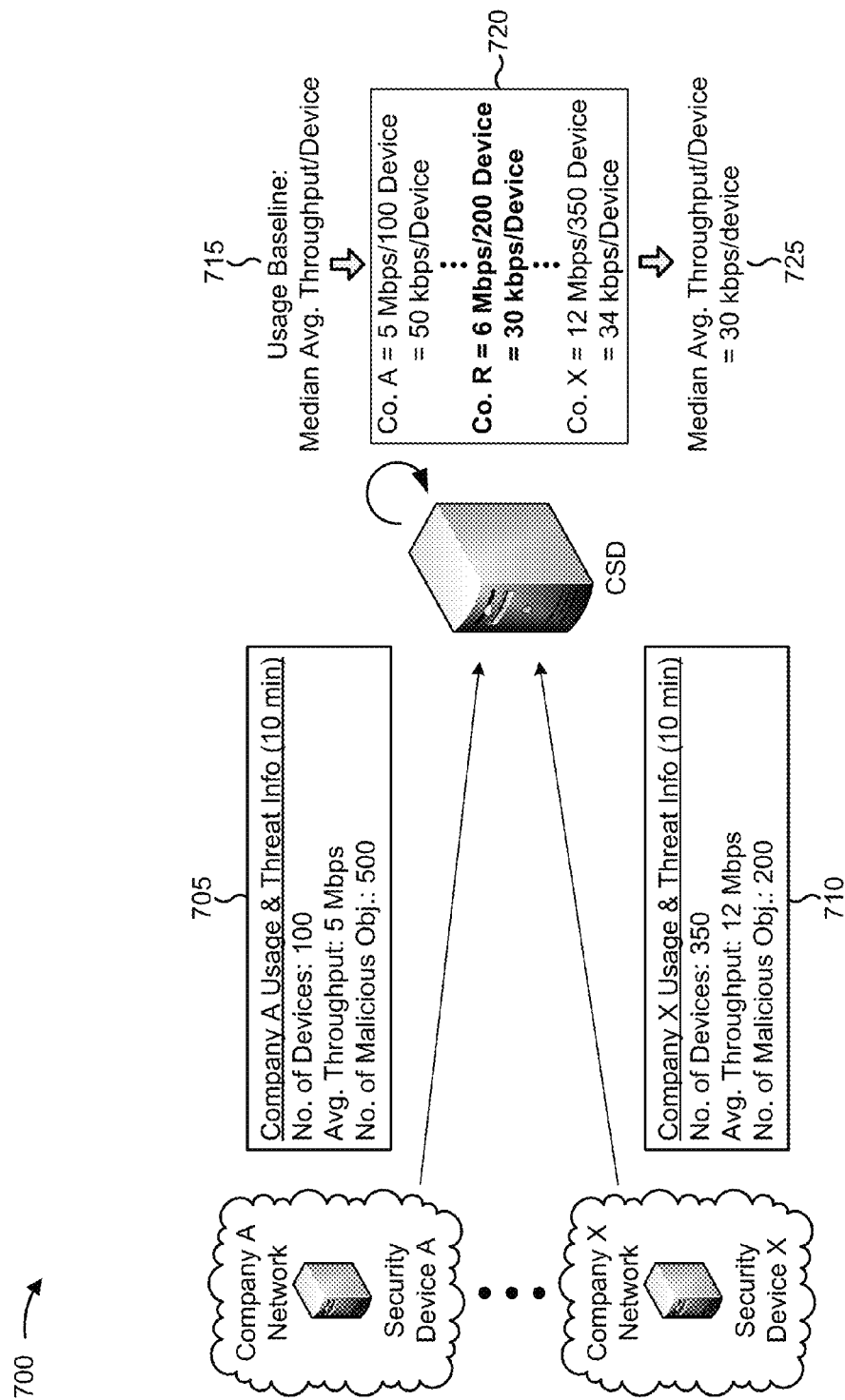
FIG. 7 is a diagram of an example implementation relating to the example process shown in FIG. 6.

FIG. 7 is a diagram of an example implementation 700 relating to example process 600 shown in FIG. 6. For the purposes of example implementation 700, assume that each client network 210 in a group of client networks 210 (e.g., company A network through company X network) includes a group of client devices 220 and a security device 230 (e.g., security device A through security device X). Further, assume that each security device 230 is configured to determine usage and threat information, associated with a corresponding client network 210, and provide the usage and threat information central security device 240 (e.g., CSD) associated with the group of client networks 210.

As shown in FIG. 7, and by reference number 705, CSD may receive from security device A (e.g., included in the company A network) usage and threat information associated with company A network for a particular ten minute period of time. As shown, the company A network usage information may indicate that the company network A includes 100 devices, and that an average total throughput for the company A network, during the particular ten minute period of time, is 5 Mbps. As further shown, the company A network threat information may indicate that 500 malicious objects were detected traversing the company A network during the particular ten minute period of time.

As shown by reference number 710, CSD may also receive from security device X (e.g., included in the company X network) usage and threat information associated with the company X network for the particular ten minute period of time. As shown, the company X network usage information may indicate that the company X network includes 350 devices, and that an average total throughput for the company X network, during the particular ten minute period of time, is 12 Mbps. As further shown, the company X network threat information may indicate that 200 malicious objects were detected traversing the company X network during the particular ten minute period of time. CSD may receive usage and threat information, associated with other client networks 210 (e.g., a company B network through a company W network), in a similar manner.

As shown by reference number 715, CSD may be configured to determine a usage baseline, associated with the group of client networks 210, as a value equal to a median of average throughputs per device associated with the group of client networks 210. As shown by reference number 720, CSD may determine an average throughput per device that corresponds to each client network 210 (e.g., including a company A network average throughput per device equal to 5 Mbps/100 device=50 kilobits per second (kbps), a company R network average throughput per device equal to 6 Mbps/200 device=30 kbps, and a company X network average throughput per device equal to 12 Mbps/350 device=34 kbps). For the purposes of example implementation 700, assume that CSD determines an average throughput per device for each client network 210, and, as shown by reference number 725, determines that the median average throughput per device is equal to 30 kbps/device (e.g., corresponding to the company R network).

As indicated above, FIG. 7 is provided merely as an example. Other examples are possible and may differ from what was described with regard to FIG. 7.

Figure 8:
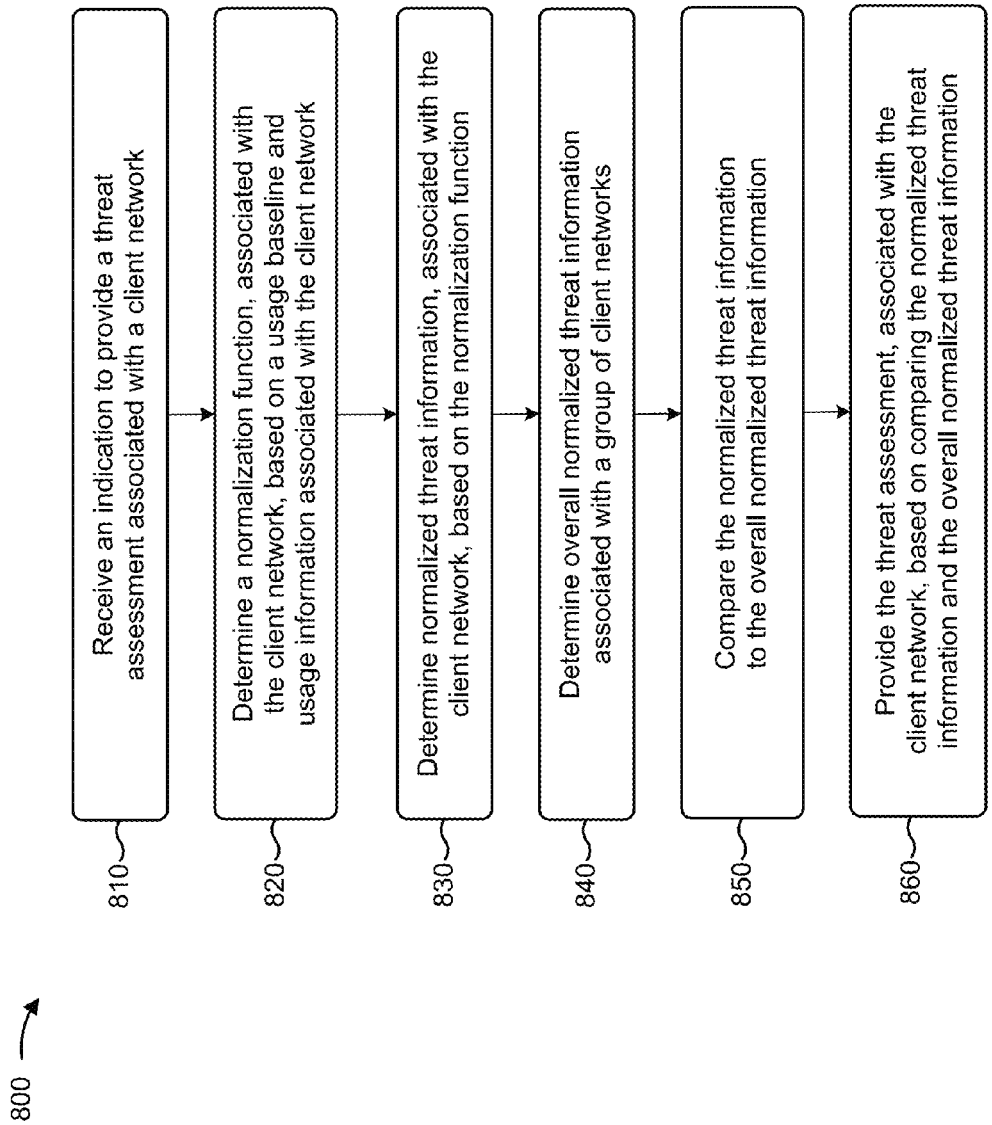
FIG. 8 is a flow chart of an example process for providing a threat assessment, associated with a client network, based on comparing normalized threat information, associated with the client network, and overall normalized threat information associated with a group of client networks.

FIG. 8 is a flow chart of an example process 800 for providing a threat assessment, associated with a client network, based on comparing normalized threat information, associated with the client network, and overall normalized threat information associated with a group of client networks. In some implementations, one or more process blocks of FIG. 8 may be performed by central security device 240. In some implementations, one or more process blocks of FIG. 8 may be performed by another device or a group of devices separate from or including central security device 240, such as security device 230 or another device included in environment 200.

As shown in FIG. 8, process 800 may include receiving an indication to provide a threat assessment associated with a client network (block 810). For example, central security device 240 may receive an indication to provide a threat assessment associated with client network 210. In some implementations, central security device 240 may receive the indication after central security device 240 receives usage and threat information associated with client network 210. Additionally, or alternatively, central security device 240 may receive the indication when the indication is provided by another device, such as security device 230 included in client network 210.

A threat assessment may include information associated with a comparison of a level of malicious activity, associated with a particular client network 210 during a period of time, as compared to an overall (e.g., mean, median, mode, etc.) level of malicious activity associated with one or more other client networks 210 during the period of time. For example, a threat assessment, associated with a particular client network 210 may include information indicating whether the particular client network 210 is sending and/or receiving a relatively higher quantity of malicious objects than other client networks 210, is sending and/or receiving a relatively lower quantity of malicious objects than other client networks 210, is sending and/or receiving a relatively similar quantity of malicious objects as compared to other client networks 210, or the like. In some implementations, the threat assessment may including information associated with a quantity of malicious objects, one or more types of the malicious objects, one or more levels of severity associated with the malicious objects, one or more attack vectors associated with the malicious objects, or the like. In some implementations, central security device 240 may provide the threat assessment based on comparing normalized threat information, associated with client network 210, to overall normalized threat information associated with a group of client networks 210, as described below.

In some implementations, central security device 240 may receive the indication to provide the threat assessment based on receiving the usage and threat information associated with client network 210 (i.e., receiving the usage and threat information may act as the indication). For example, central security device 240 may be configured to (e.g., automatically) provide a threat assessment, associated with client network 210, when central security device 240 receives the usage and threat information associated with client network 210. Additionally, or alternatively, central security device 240 may receive the indication based on information provided by another device. For example, central security device 240 may receive the indication based on a threat assessment request provided by security device 230 (e.g., when a user of security device 230 wishes to view a threat assessment). Additionally, or alternatively, central security device 240 may receive the indication based on a configuration of central security device 240 (e.g., when central security device 240 is configured to provide a threat assessment every four hours, every 24 hours, etc.).

As further shown in FIG. 8, process 800 may include determining a normalization function associated with the client network, based on a usage baseline and usage information associated with the client network (block 820). For example, central security device 240 may determine a normalization function, associated with client network 210, based on a usage baseline and usage information associated with client network 210. In some implementations, central security device 240 may determine the normalization function after central security device 240 receives the indication to provide the threat assessment associated with client network 210. Additionally, or alternatively, central security device 240 may determine the normalization function after central security device 240 receives the usage and threat information associated with client network 210. Additionally, or alternatively, central security device 240 may determine the normalization function when central security device 240 receives information indicating that central security device 240 is determine the normalization function.

A normalization function may include a function that, when applied to usage information associated with client network 210, causes the usage information to be equal to a usage baseline. For example, central security device 240 may receive usage information associated with a group of client networks 210, and determine a usage baseline, as described above. In this example, central security device 240 may determine a normalization function (e.g., a function associated with applying a normalization factor (a value between 0 and 1) to the usage information, a function determined based on a statistical distribution and associated with the usage information and the usage baseline, a function determined based on an empirical distribution and associated with the usage information and the usage baseline, etc.) that, when applied to usage information associated with a particular client network 210 (e.g., included in the group of client networks 210) causes the usage information, associated with the particular client network 210, to be equal to the usage baseline. In some implementations, the normalization function may allow client networks 210 with different characteristics (e.g., different quantities of client devices 220, different average total throughputs, etc.) to be compared, as described below.

In some implementations, central security device 240 may determine the normalization function based on the usage baseline and the usage information associated with client network 210. In one example implementation, central security device 240 may be configured to determine a normalization factor, associated with the usage baseline, by dividing the usage baseline by corresponding usage information associated with client network 210, and determining the normalization function as a function associated with multiplying the usage information by the normalization factor. In some implementations, central security device 240 may determine the normalization function using a different technique. In some implementations, central security device 240 may determine a revised normalization function (e.g., if central security device 240 determines a normalization function based on a usage baseline and subsequently receives additional usage information that causes central security device 240 to determine a revised usage baseline, then central security device 240 may determine a revised normalization function based on the revised usage baseline).

In some implementations, central security device 240 may determine (e.g., based on a request from a user of security device 230) multiple normalization functions (e.g., different normalization functions) associated with client network 210. Central security device 240 may then apply the multiple normalization functions (e.g., as described below) in order to determine provide multiple corresponding normalizations of the threat information. Additionally, or alternatively, central security device 240 may determine the normalization function based on a programmatic definition. For example, central security device 240 may receive user input (e.g., a script created by the user) that indicates a manner in which the normalization function is to be determined and/or that identifies information that is to be included in or provided by the normalization function.

As further shown in FIG. 8, process 800 may include determine normalized threat information, associated with the client network, based on the normalization function (block 830). For example, central security device 240 may determine normalized threat information, associated with client network 210, based on the normalization function. In some implementations, central security device 240 may determine the normalized threat information, associated with client network 210, after central security device 240 determines the normalization function associated with client network 210. Additionally, or alternatively, central security device 240 may determine the normalized threat information when central security device 240 receives information (e.g., user input) indicating that central security device 240 is to determine the normalized threat information.

In some implementations, central security device 240 may apply the normalization function to the threat information in order to determine the normalized threat information. For example, assume that central security device 240 has received threat information, associated with client network 210, that identifies a quantity of malicious objects (e.g., 500 malicious objects) that traversed client network 210 during a particular period of time. In this example, assume that central server device 240 determines a normalization function that identifies a normalization factor, to be applied to the threat information associated with client network 210, equal to a particular value (e.g., 0.3). Here, central security device 240 may apply the normalization function to the threat information by multiplying the threat information by the normalization factor (e.g., by multiplying the 500 malicious objects by 0.3). In some implementations, central security device 240 may apply another type of normalization function to the threat information (e.g., where the threat information is used as an input to another type of normalization function, and the output of the normalization function is normalized threat information).

In some implementations, central security device 240 may dynamically apply the normalization function to the threat information. For example, central security device may determine (e.g., based on user input, based on a configuration of central security device 240, etc.) a subset of the threat information (e.g., threat information associated with a group of client devices 220 that host a particular operating system, threat information associated with a group of client devices 220 that are less than 2 months old, etc.) and may apply the normalization function to the subset of the threat information.

In some implementations, determining the normalized threat information may allow central security device 240 to meaningfully compare the threat information to threat information associated with other client networks 210, as described below (e.g., after one or more corresponding normalization functions for the threat information, associated with the other client networks 210, are applied to the threat information associated with the other client networks 210).

As further shown in FIG. 8, process 800 may include determining overall normalized threat information associated with a group of client networks (block 840). For example, central security device 240 may determine overall normalized threat information associated with a group of client networks 210. In some implementations, central security device 240 may determine the overall normalized threat information when central security device 240 determines the normalized threat information associated with client network 210. Additionally, or alternatively, central security device 240 may determine the overall normalized threat information when central security device 240 receives information indicating that central security device 240 is to determine the overall normalized threat information.

Overall normalized threat information may include threat information, corresponding to a group of client networks 210, that has been normalized based on a usage baseline. For example, central security device 240 may determine a normalization function for each client network 210 in the group of client networks 210, in the manner described above. Central security device 240 may then apply each normalization function to threat information corresponding to each client network 210 (e.g., in order to determine normalized threat information corresponding to each client network 210), and based on the normalized threat information corresponding to each client network 210, central security device 240 may determine overall normalized threat information (e.g., a list of normalized threat information associated with each client network 210, a mean of the normalized threat information corresponding to each client network 210, a median of the normalized threat information corresponding to each client network 210, a mode of the normalized threat information corresponding to each client network 210, etc.). For example, in some implementations, the overall normalized threat information may represent a normalized average level of malicious activity across the group of client networks 210 (e.g., an average quantity of malicious objects, an average severity of malicious objects, an average type of malicious objects, etc.) to which the normalized threat information, associated with client network 210, may be compared, as described below.

As further shown in FIG. 8, process 800 may include comparing the normalized threat information and the overall normalized threat information (block 850). For example, central security device 240 may compare the normalized threat information, associated with client network 210, and the overall normalized threat information associated with the group of client networks 210. In some implementations, central security device 240 may compare the normalized threat information and the overall normalized threat information after central security device 240 determines the overall normalized threat information. Additionally, or alternatively, central security device 240 may compare the normalized threat information and the overall normalized threat information after central security device 240 normalizes the threat information associated with client network 210. Additionally, or alternatively, central security device 240 may compare the normalized threat information and the overall normalized threat information when central security device 240 receives information indicating that central security device 240 is to compare the normalized threat information and the overall normalized threat information.

In some implementations, central security device 240 may compare the normalized threat information, associated with client network 210, and the overall normalized threat information, associated with the group of client networks 210, in order to determine how a level of malicious activity, associated with client network 210, compares to an overall level of malicious activity associated with the group of client networks 210. For example, assume that central security device 240 determines normalized threat information, associated with a particular client network 210, identifying a particular normalized quantity of malicious objects detected traversing the particular client network 210 during a period of time. Also, assume that central security device 240 determines overall normalized threat information, associated with a group of client networks 210, identifying an average normalized quantity of malicious objects traversing the group of client networks 210 during the period of time. In this example, central security device 240 may compare the particular normalized quantity of malicious objects and the average normalized quantity of malicious objects, and may determine how a level of malicious activity, associated with the particular client network 210, compares to an average level of malicious activity associated with the group of client networks 210. Here, the use of the particular normalized quantity of malicious objects and the average normalized quantity of malicious objects may allow malicious activity to be compared regardless of individual characteristics of each client network 210 (e.g., regardless of throughput, regardless of a number of client devices 220, etc.). Additionally, or alternatively, central security device 240 may compare a subset of the normalized threat information, associated with client network 210, and a corresponding subset of the overall normalized threat information, associated with the group of client networks 210.

As further shown in FIG. 8, process 800 may include providing the threat assessment, associated with the client network, based on comparing the normalized threat information and the overall normalized threat information (block 860). For example, central security device 240 may provide the threat assessment, associated with client network 210, based on comparing the normalized threat information and the overall normalized threat information. In some implementations, central security device 240 may provide the threat assessment after central security device 240 compares the normalized threat information and the overall normalized threat information. Additionally, or alternatively, central security device 240 may provide the threat assessment when central security device 240 receives information indicating that central security device 240 is to provide the threat assessment.

In some implementations, the threat assessment may include information associated with a comparison of a level of malicious activity, associated with client network 210 and a period of time, as compared to an overall level of malicious activity associated with a group of client networks 210 and the period of time. In some implementations, the threat assessment may be based on a threat threshold. For example, if the normalized threat information, associated with client network 210, exceeds the overall normalized threat information by a threshold amount, then central security device 240 may determine a threat assessment indicating that client network 210 is experiencing a high level of malicious activity, a severe amount of malicious activity, a dangerous amount of malicious activity, or the like. As another example, if the normalized threat information, associated with client network 210, is below the overall normalized threat information by a threshold amount, then central security device 240 may determine a threat assessment indicating that client network 210 is experiencing a low level of malicious activity, a safe amount of malicious activity, or the like. In some implementations, the threat assessment may identify a quantity of malicious objects, one or more types of the malicious objects, one or more levels of severity associated with the malicious objects, one or more attack vectors associated with the malicious objects, or the like.

In some implementations, central security device 240 may generate the threat assessment based on a programmatic definition. For example, central security device 240 may receive user input (e.g., a script created by the user) that indicates a manner in which the threat assessment is to be generated and/or that identifies threat information that is to be included in or provided by the threat assessment. Additionally, or alternatively, the threat assessment may be queriable to allow a user and/or security device 230 to determine particular information, included in the threat assessment, associated with client devices 220, a particular time period, or the like (e.g., what was the threat level during a particular time period for client devices 210 that are over one year old? etc).

In some implementations, central security device 240 may provide the threat assessment to security device 230, included in client network 210, such that a user of security device 230 may view the threat assessment and/or to cause security device 230 to implement (e.g., update, adjust, modify, remove, etc.) a security solution, associated with protecting client network 210, based on the threat assessment.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Figure 9:
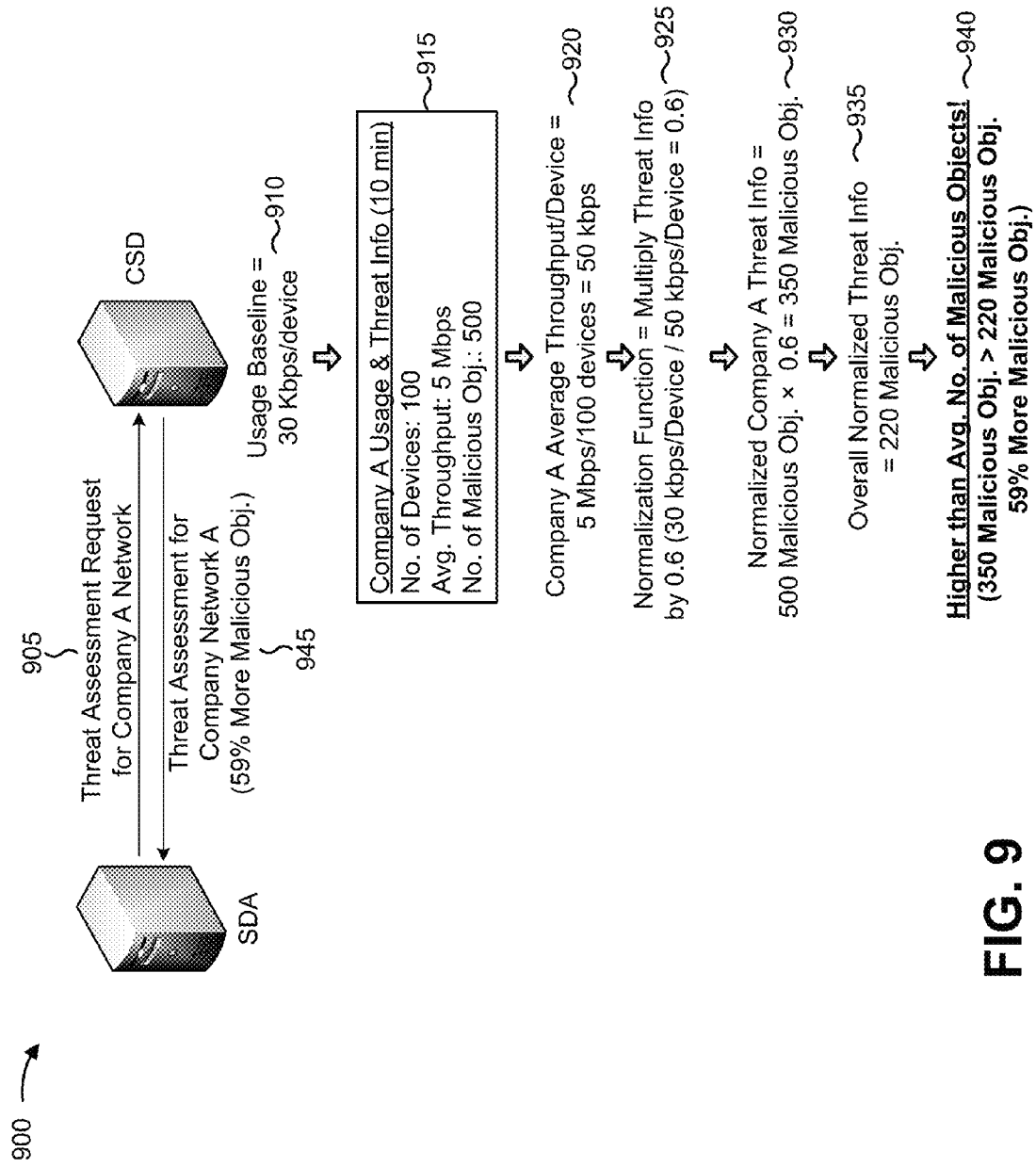
FIG. 9 is a diagram of an example implementation relating to the example process shown in FIG. 8.

FIG. 9 is a diagram of an example implementation 900 relating to example process 800 shown in FIG. 8. For the purposes of example implementation 900, assume that central security device 240 (e.g., CSD) has received usage information, associated with a group of client networks 210 (e.g., company A network through company X network) and a particular period of time (e.g., a ten minute period of time), and threat information associated with the group of client networks and the particular period of time. Further, assume that CSD has determined, based on the usage information associated with the group of client networks 210, a usage baseline for the particular period of time equal to 30 kbps/device (e.g., as shown above with regard to example implementation 700).

As shown in FIG. 9, and by reference number 905, security device 230 (e.g., SDA), associated with the company A network, may send, to CSD, a request for a threat assessment associated with the particular ten minute period of time. As shown by reference number 910, CSD may determine the usage baseline, as described above. As shown by reference number 915, CSD may determine usage and threat information associated with the company A network (e.g., based on receiving the usage and threat information at an earlier time). As shown, the company network A usage information may indicate that the company A network includes 100 devices, and that an average total throughput for the company A network, during the particular ten minute period of time, is 5 Mbps. As further shown, the company A network threat information may indicate that 500 malicious objects were detected traversing the company A network during the particular ten minute period of time.

As shown by reference number 920, CSD may determine an average throughput per device for the company A network equal to 50 kbps (e.g., 5 Mbps/100 devices=50 kbps/device). As shown by reference number 925, CSD may determine, based on the average throughput per device for the company A network and the usage baseline, a normalization function, associated with the company A network, that identifies a normalization factor equal to 0.6 (e.g., 30 kbps/device÷50 kbps/device=0.6). As shown by reference number 930, CSD may determine normalized company A threat information, associated with the company A network, based on the applying normalization function to the company A threat information (e.g., by multiplying the company A network threat information by the normalization factor). As shown, the normalized company A threat information may be equal to a quantity of 350 malicious objects (e.g., 500 malicious objects×0.6=350 malicious objects).

As shown by reference number 935, assume that CSD determines normalized threat information for each of the other client networks 210 (e.g., client network B through client network X) in a similar manner, and determines overall normalized threat information, based on the normalized threat information for each client network 210, equal to 220 malicious objects (e.g., assume CSD computes an average quantity of malicious objects based on a group of normalized quantities of malicious objects corresponding to the group of client networks 210). As shown by reference number 945, CSD may compare the normalized threat information associated with the company A network (e.g., a normalized quantity of 350 malicious objects in the particular ten minute period of time), and the overall normalized threat information associated with the group of client networks 210 (e.g., an average normalized quantity of 220 malicious objects in the particular ten minute period of time), and may determine that the company A network detected 59% more malicious objects than the overall normalized quantity of malicious objects during the particular ten minute period of time (e.g., (350−220)/220×100=59%). As shown by reference number 945, CSD may provide, to SDA, a threat assessment indicating that the company A network detected 59% more malicious objects than the overall normalized quantity of malicious objects during the particular ten minute period of time (e.g., indicating that the company A network may subject to a directed malware attack). SDA may receive the threat assessment, and may implement necessary security measures (e.g., increase a blocking threshold, perform additional and/or deeper scanning, implement a sandbox for object testing, etc.) in order to ensure that an infection does not take hold within the company A network.

As indicated above, FIG. 9 is provided merely as an example. Other examples are possible and may differ from what was described with regard to FIG. 9.

Implementations described herein may provide a solution that allows a detected level of malicious activity, associated with a client network, to be compared to one or more other detected levels of malicious activity, associated with one or more other client networks, such that a threat assessment, associated with the client network, may provide insight associated with the detected level of malicious activity. In this way, a security device and/or an administrator, associated with the client network, may be notified that the client network is being targeted by malicious activity (e.g., and the security device may implement necessary measures in order to ensure that an infection does not take hold within the client network, accordingly).

The foregoing disclosure provides illustration and description, but is not intended to be exhaustive or to limit the implementations to the precise form disclosed. Modifications and variations are possible in light of the above disclosure or may be acquired from practice of the implementations. For example, while the processes and/or methods described herein primarily describe normalization and baselining in the context of time-based metrics, in some implementations, normalization and baselining may be based another type of information, such as a size of client network 220, a throughput of network client 220, or another type of information.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive usage information associated with a group of client networks,
the group of client networks including at least two client networks,
the usage information including particular usage information associated with a particular client network of the group of client networks;
receive threat information associated with the group of client networks,
the threat information including particular threat information associated with the particular client network;
determine a usage baseline for the group of client networks based on the usage information associated with the group of client networks,
the usage baseline for the group of client networks being based on at least one of a mean usage metric value, a median usage metric value, or a mode usage metric value for the group of client networks;
determine a normalization function, associated with the particular client network, based on the usage baseline for the group of client networks and the particular usage information associated with the particular client network,
the one or more processors, when determining the normalization function, are to:
divide the usage baseline, for the group of client networks, by a usage metric value, associated with the particular client network, to determine a normalization factor,
the usage metric value being included in the particular usage information, and
determine the normalization function based on the normalization factor and the usage metric value;
determine normalized threat information, associated with the particular client network, based on a value equal to a result of multiplying the normalization function and the particular threat information;
determine overall normalized threat information associated with the group of client networks;
compare the normalized threat information, associated with the particular client network, and the overall normalized threat information associated with the group of client networks; and
provide a threat assessment associated with the particular client network based on comparing the normalized threat information, associated with the particular client network, and the overall normalized threat information associated with the group of client networks.

2. The device of claim 1, where the usage information, associated with the group of client networks, and the threat information, associated with the group of client networks, are associated with a particular period of time.

3. The device of claim 1, where the one or more processors, when determining the usage baseline, are to:
compute the mean usage metric value, associated with the group of client networks, based on the usage information associated with the group of client networks; and
determine the usage baseline as a value equal to the mean usage metric value.

4. The device of claim 1, where the one or more processors, when determining the overall normalized threat information, are to:
   determine a group of normalization functions,
      the group of normalization functions including the normalization function associated with the particular client network;
   determine group normalized threat information, associated with the group of client networks, based on the group of normalization functions and the threat information;
   compute mean normalized threat information based on the group normalized threat information associated with the group of client networks; and
   determine the overall normalized threat information as a value equal to the mean normalized threat information.

5. The device of claim 1, where
   the threat assessment indicates that the particular client network detected a high level of malicious activity, during a particular period of time, relative to the group of client networks.

6. The device of claim 1, where the one or more processors are further to:
   anonymize the usage information associated with the group of client networks.

7. The device of claim 1, where the threat assessment includes information associated with at least one of:
   a quantity of malicious objects,
   one or more types of the malicious objects,
   one or more levels of severity associated with the malicious objects, or
   one or more attack vectors associated with the malicious objects.

8. A non-transitory computer-readable medium storing instructions, the instructions comprising:
   one or more instructions that, when executed by one or more processors, cause the one or more processors to:
      obtain usage information,
         the usage information being associated with a group of networks,
         the group of networks including at least two networks, and
         the usage information including particular usage information associated with a particular network of the group of networks;
      obtain threat information,
         the threat information being associated with the group of networks, and
         the threat information including particular threat information associated with the particular network;
      determine a usage baseline for the group of networks based on the usage information associated with the group of networks,
         the usage baseline for the group of networks being based on at least one of a mean usage metric value, a median usage metric value, or a mode usage metric value for the group of networks;
      compute a normalization function, corresponding to the particular network, based on the usage baseline for the group of networks and the particular usage information associated with the particular network,
         the one or more instructions, that cause the one or more processors to determine the normalization function, cause the one or more processors to:
            divide the usage baseline, for the group of networks, by a usage metric value, associated with the particular network, to determine a normalization factor,
               the usage metric value being included in the particular usage information, and
            determine the normalization function based on the normalization factor and the usage metric value;
      determine normalized threat information based on a value equal to a result of multiplying the normalization factor function and the particular threat information,
         the normalized threat information corresponding to the particular network; determine overall normalized threat information,
         the overall normalized threat information being associated with the group of networks;
      compare the normalized threat information and the overall normalized threat information; and
      provide a threat assessment associated with the particular network based on comparing the normalized threat information and the overall normalized threat information.

9. The non-transitory computer-readable medium of claim 8, where the usage information, associated with the group of networks, and the threat information, associated with the group of networks, are associated with a particular period of time.

10. The non-transitory computer-readable medium of claim 8, where the one or more instructions, that cause the one or more processors to determine the usage baseline, cause the one or more processors to:
   compute the median usage metric value, associated with the group of networks, based on the usage information associated with the group of networks; and
   determine the usage baseline as a value equal to the median usage metric value.

11. The non-transitory computer-readable medium of claim 8, where the one or more instructions, that cause the one or more processors to determine the overall normalized threat information, cause the one or more processors to:
   compute a group of normalization functions,
      the group of normalization functions including the normalization functions associated with the particular network;
   determine group normalized threat information, associated with the group of networks, based on the group of normalization functions and the threat information;
   compute median normalized threat information based on the group normalized threat information associated with the group of networks; and
   determine the overall normalized threat information as a value equal to the median normalized threat information.

12. The non-transitory computer-readable medium of claim 8, where the threat assessment indicates that the particular network detected a low level of malicious activity, during a particular period of time, relative to the group of networks.

13. The non-transitory computer-readable medium of claim 8, where the one or more instructions, when executed by the one or more processors, further cause the one or more processors to:
   anonymize the usage information associated with the group of networks.

14. The non-transitory computer-readable medium of claim 8, where the threat assessment includes information associated with at least one of:
   a quantity of malicious objects,
   one or more types of the malicious objects,
   one or more levels of severity associated with the malicious objects, or
   one or more attack vectors associated with the malicious objects.

15. A method, comprising:
   receiving, by a device, usage information associated with a set of client networks,
      the set of client networks including at least two client networks,
      the usage information including particular usage information associated with a particular client network of the set of client networks, and
      the usage information corresponding to a particular period of time;
   receiving, by the device, threat information associated with the set of client networks,
      the threat information including particular threat information associated with the particular client network, and
      the threat information corresponding to the particular period of time;
   determining, by the device, a usage baseline for the set of client networks,
      the usage baseline for the set of client networks being based on at least one of an average usage metric value, a median usage metric value, or a mode usage metric value for the set of client networks;
   determining, by the device, a normalization function associated with the particular client network,
      the normalization function being determined based on the usage baseline for the set of client networks and the particular usage information associated with the particular client network,
      where determining the normalization function comprises:
         dividing the usage baseline, for the set of client networks, by a usage metric value, associated with the particular client network, to determine a normalization factor,
            the usage metric value being included in the particular usage information, and
         determining the normalization function based on the normalization factor and the usage metric value;
   determining, by the device, normalized threat information associated with the particular client network,
      the normalized threat information being determined based on a value equal to a result of multiplying the normalization function and the particular threat information;
   determining, by the device, overall normalized threat information associated with the set of client networks;
   comparing, by the device, the normalized threat information and the overall normalized threat information; and
   providing, by the device, a threat assessment associated with the particular client network based on comparing the normalized threat information and the overall normalized threat information.

16. The method of claim 15, where determining the usage baseline comprises:
   computing the average usage metric value, associated with the set of client networks, based on the usage information associated with the set of client networks; and
   determining the usage baseline as a value equal to the average usage metric value.

17. The method of claim 15, where determining the overall normalized threat information comprises:
   determining a set of normalization functions,
      the set of normalization functions including the normalization function associated with the particular client network;
   determining a set of normalized threat information, associated with the set of client networks, based on the set of normalization functions and the threat information;
   computing average normalized threat information based on the set of normalized threat information associated with the set of client networks; and
   determining the overall normalized threat information as a value equal to the average normalized threat information.

18. The method of claim 15, where
   the threat assessment indicates that the particular client network detected a low level of malicious activity, during the particular period of time, relative to the set of client networks.

19. The method of claim 15, further comprising:
   anonymizing the usage information associated with the set of client networks.

20. The method of claim 15, where the threat assessment includes information associated with at least one of:
   a quantity of malicious objects,
   one or more types of the malicious objects,
   one or more levels of severity associated with the malicious objects, or
   one or more attack vectors associated with the malicious objects.

* * * * *

UNITED STATES PATENT AND TRADEMARK OFFICE
CERTIFICATE OF CORRECTION

| | | |
|---|---|---|
| PATENT NO. | : 9,571,519 B2 | Page 1 of 1 |
| APPLICATION NO. | : 14/500181 | |
| DATED | : February 14, 2017 | |
| INVENTOR(S) | : Kyle Adams et al. | |

It is certified that error appears in the above-identified patent and that said Letters Patent is hereby corrected as shown below:

In the Claims

Column 24, Line 12, Claim 8 change "factor function and the particular threat" to --function and the particular threat--

Signed and Sealed this
Eleventh Day of April, 2017

Michelle K. Lee
*Director of the United States Patent and Trademark Office*